United States Patent
Uchida (10) Patent No.: US 8,813,081 B2
(45) Date of Patent: Aug. 19, 2014

(54) IMAGE PROCESSING APPARATUS USING A LICENSE, LICENSE MANAGEMENT SYSTEM, AND CONTROL METHOD THEREFOR

(75) Inventor: Takayuki Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1527 days.

(21) Appl. No.: 11/859,565

(22) Filed: Sep. 21, 2007

(65) Prior Publication Data

US 2008/0155543 A1     Jun. 26, 2008

(30) Foreign Application Priority Data

Dec. 21, 2006   (JP) .................................. 2006-344722

(51) Int. Cl.
*G06F 9/46* (2006.01)
*G06F 21/00* (2013.01)
*G06F 21/10* (2013.01)

(52) U.S. Cl.
CPC .................................. *G06F 21/105* (2013.01)
USPC .......................................... 718/100; 705/59

(58) Field of Classification Search
USPC ...................... 726/26, 27; 718/104
See application file for complete search history.

(56) References Cited

U.S. PATENT DOCUMENTS

| 5,260,999 | A | * | 11/1993 | Wyman | 705/59 |
| 5,970,223 | A | * | 10/1999 | Debes et al. | 358/1.16 |
| 7,013,294 | B1 | * | 3/2006 | Sekigawa et al. | 705/59 |
| 7,477,745 | B2 | * | 1/2009 | Nakamura et al. | 380/243 |
| 2003/0032406 | A1 | * | 2/2003 | Minear et al. | 455/410 |
| 2004/0196498 | A1 | * | 10/2004 | Klassen | 358/1.15 |
| 2006/0021012 | A1 | | 1/2006 | Ito | |
| 2007/0005505 | A1 | * | 1/2007 | D'Alo et al. | 705/59 |
| 2007/0179899 | A1 | * | 8/2007 | Hase et al. | 705/59 |

FOREIGN PATENT DOCUMENTS

| CN | 1555644 | 12/2004 |
| CN | 1713103 | 12/2005 |
| JP | 2001-092550 A | 4/2001 |
| JP | 2004-234167 A | 8/2004 |
| JP | 2004-287860 A | 10/2004 |
| JP | 2005-062961 A | 3/2005 |
| JP | 2005-251070 A | 9/2005 |
| JP | 2006-040252 A | 2/2006 |

* cited by examiner

*Primary Examiner* — Abdullah Al Kawsar
(74) *Attorney, Agent, or Firm* — Canon USA, Inc. IP Division (57) ABSTRACT

According to the present invention, it is possible to execute a process by an image processing apparatus while a user does not need to pay attention to a license necessary for executing application software for every image processing apparatus. In accordance with a description content of a statement of job and a function (application software) which the image processing apparatus is provided with, such a scheme is provided that a license necessary for executing the process is obtained from a license management server. An image processing apparatus executes a determined process, thus making it possible to effectively utilize the license.

7 Claims, 6 Drawing Sheets

IMAGE PROCESSING APPARATUS USING A LICENSE, LICENSE MANAGEMENT SYSTEM, AND CONTROL METHOD THEREFOR

BACKGROUND OF THE INVENTION

1. Field of the Invention

The present invention relates to an image processing apparatus capable of executing an application that requires a license and also executing a job in accordance with a statement of job, a license management apparatus for issuing a license, a license management system, and a control method therefor.

2. Description of the Related Art

For example, in a POD (Print On Demand) system, a process is performed through delivery and receipt of a statement of work which describes a process content and a procedure indicating how to print an electronic document file. This is a scheme for subsequently executing a necessary process in each step and passing the work to the next step with respect to a history, a work instruction, management information, etc. A JDF (Job Definition Format) is known as a method of describing such a print process procedure (for example, refer to Japanese Patent Laid-Open No. 2004-234167).

The JDF is also referred to as statement of job or description of job.

Also, in a multi function image processing apparatus that is referred to as an MFP (Multi Function Peripheral), it is possible to execute operational functions such as scan, copy, print, and Send functions including mail transmission and file transfer of document data or the original. Then, a Java® platform for operating an application and a program is mounted in this image processing apparatus. Examples of applications and programs that can be executed on the image processing apparatus on which the Java platform is mounted include management of document data, a PDF conversion process, and an OCR conversion process.

While the JDF is input to an MFP, by combining these functions of the MFP, for example, it is examined that a series of processes "Scan-PDF Conversion-Send" (an electronic document obtained by scanning the original is subjected to PDF conversion and the PDF document is attached to a mail to be sent) are executed.

The contents of the JDF are varied including a routine task, a specific process content individually defined, and the like. In addition, the image processing apparatuses configured to perform the processings also have different executable functions (application software) for every image processing apparatus. Furthermore, in order to operate the application and the program that can be executed on the Java platform of the image processing apparatus, the application and the program respectively need licenses.

It is noted that a floating license management method and system based on a license management server configured to manage a license of basis software used in a network terminal apparatus are known (for example, refer to Japanese Patent Laid-Open No. 2001-092550).

Also, according to Japanese Patent Laid-Open No. 2004-287860, the respective image processing apparatuses connected to a network cooperate to process a plurality of processes that should be performed on document data. In addition, Japanese Patent Laid-Open No. 2004-287860 describes that setting of cooperation of a plurality of processes (services) can be reused by other external apparatus. A statement of the service cooperation described in Japanese Patent Laid-Open No. 2004-287860 is referred to as job flow. The job flow is also abbreviated as JF. The JF is also referred to as statement of job or description of job.

However, according to the conventional technologies, a user needs to grasp executable processes for every image processing apparatus and it is necessary to appropriately use the image processing apparatuses in accordance with the process content. Alternatively, it is necessary to previously obtain licenses of application software that may be possibly used by all the image processing apparatuses.

SUMMARY OF THE INVENTION

The present invention allows an image processing apparatus to execute a process while a user does not need to pay attention to a license necessary for executing application software for every image processing apparatus. The present invention provides a scheme for obtaining a license necessary for executing a process from a license management server in accordance with a description content of a statement of job and application software that an image processing apparatus is provided with. A desired process can be executed by an image processing apparatus and the license can be effectively used.

In order to achieve the above-mentioned configuration, according to an aspect of the present invention, there is provided an image processing apparatus having an application mounted thereto, requesting license issuance to a license management server apparatus when the application is used, and being capable of using the application by receiving the license, the image processing apparatus including: an application determination unit configured to determine a necessary application for executing a job by analyzing a statement of job; a license determination unit configured to determine whether the license is necessary for using the application; a license obtaining unit configured to request license issuance to the license management server apparatus when it is determined that the license is necessary as a result of the determination of the license determination unit; and a job execution unit configured to execute the job in accordance with the statement of job.

In order to achieve the above-mentioned configuration, according to another aspect of the present invention, there is provided a license management system, including: a license management apparatus configured to manage a license that allows application use; and an image processing apparatus having an application mounted thereto and being connected to the license management apparatus via a communication medium, in which license issuance is requested to the license management apparatus when the application is used and the application can be used upon reception of the license, the license management apparatus including a license issuance unit configured to issue a license corresponding to license issuance request from the image processing apparatus, and the image processing apparatus including: an application determination unit configured to determine a necessary application for executing a job by analyzing a statement of job; a license determination unit configured to determine whether the license is necessary for using the application; a license obtaining unit configured to request license issuance to the license management apparatus when it is determined that the license is necessary as a result of the determination of the license determination unit to obtain the license; and a job execution unit configured to execute the job in accordance with the statement of job.

Other features and advantages of the present invention will be apparent from the following description taken in conjunc-

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will now be described in detail in accordance with the accompanying drawings.

It is noted that regarding reference numerals in the description, same reference numerals are allocated to components common or similar among the embodiments if not otherwise specified so that repeated descriptions can be omitted.

In addition, components described in the embodiments are for purposes of illustration and are not intended to limit the scope of the present invention.

Figure 1:
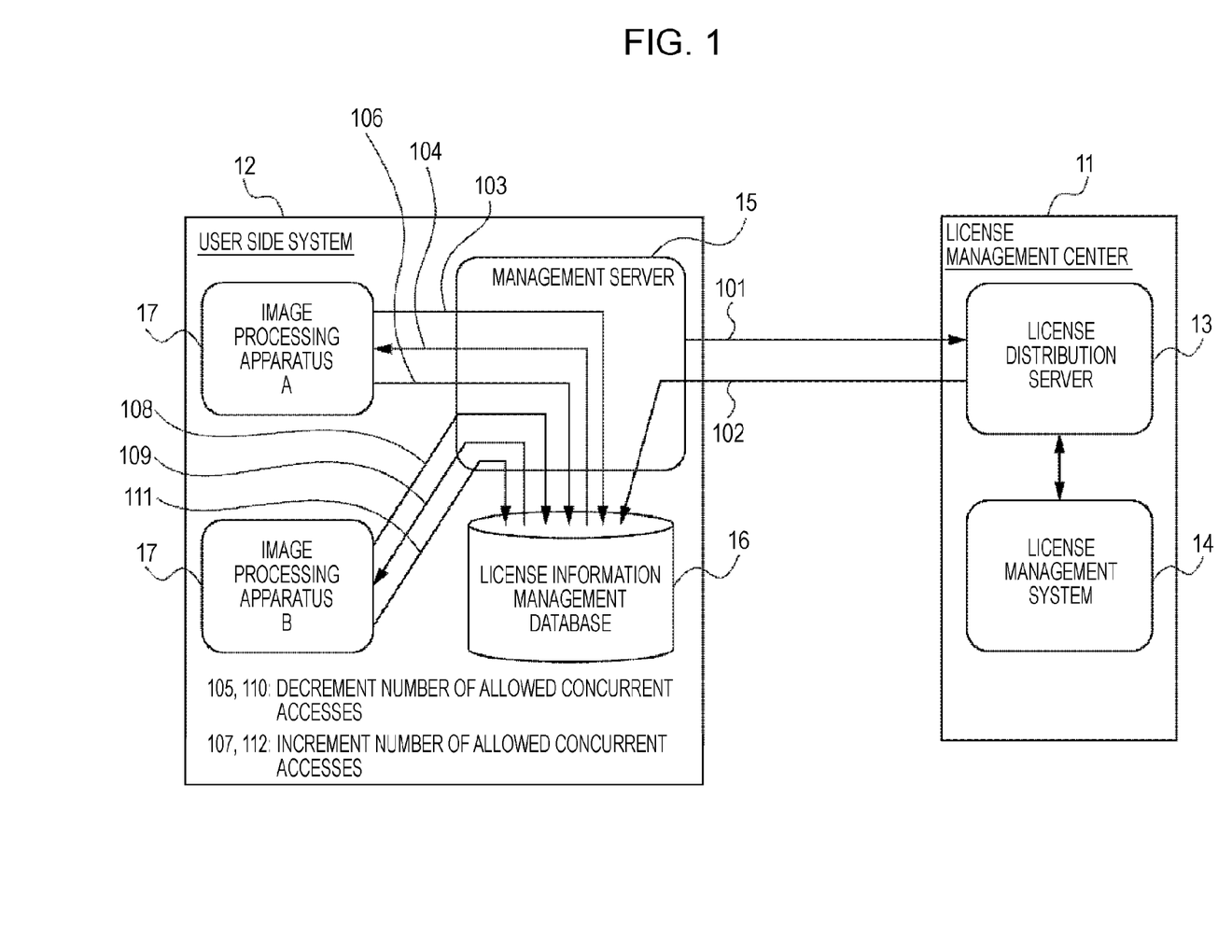
FIG. 1 is an exemplary configuration diagram of a license management system.

First, a system configuration and an application configuration according to the present invention will be described.
License Management System Configuration FIG. 1 illustrates an exemplary configuration of a floating license management system according to embodiments of the present invention.

The floating license management system is composed of a license management center 11 and a user side system 12. The license management center 11 is composed of a license distribution server 13 and a license management system 14. The user side system 12 is composed of a management server 15, a license information management database 16, and an image processing apparatus 17, which are connected via a network.

When an operation of a floating license is started, first, the management server 15 requests purchase of the floating license used in the user side system 12 (101). Then, the license distribution server 13 which has received the request distributes the floating license to the management server 15 (102). The management server 15 which has received the floating license manages information of the floating license distributed in the license information management database 16.

When image processing apparatuses A and B 17 execute the application and the program, the image processing apparatuses A and B 17 requests license use to the management server 15 configured to manage the floating licenses (103, 108). Then, the management server 15 that has received the request distributes the licenses to the image processing apparatuses 17 (104, 109). When the license information management database 16 distributes the licenses, the license information management server 15 decrements the number of allowed concurrent accesses of the floating licenses (105, 110) in the license information management database 16, thus managing the number of the floating licenses that can be distributed. Then, when the use of the application and the program is completed, the image processing apparatuses A and B 17 return the licenses to the management server 15 (106, 111). Then, the license information management server 15 increments the number of allowed concurrent accesses of the floating licenses (107, 112) in the license information management database 16.

An application management module configured to manage the application software and program is installed in the image processing apparatuses A and B 17. This application management module is a module for managing the license in the image processing apparatuses A and B 17. The application management module communicates with the management server 15 to perform license request, reception, and returning. Then, upon the reception/returning of the license, the application management module controls the use of the application software and the program in the image processing apparatuses A and B 17.

The license management center 11 and the user side system 12 are connected via a network, such as the Internet, and such a configuration may be adopted that the license management center issues licenses for a plurality of different user management systems.

The image processing apparatus 17 is a multi function image processing apparatus referred to as MFP (Multi function Peripheral) as described above. In the MFP, it is possible to execute operational functions such as scan, copy, print, and send functions including mail transmission and file transfer of document data or the original. Also, a Java platform for operating application software and a program is mounted to in this image processing apparatus. A Java program can be executed on the image processing apparatus having the Java platform mounted thereto. It is noted that the image processing apparatuses A and B 17 of the above-described license management system are used for describing that a plurality of image processing apparatuses may exist for lending licenses in the system.

An execution environment of the application software mounted to the multi function image processing apparatus is the Java platform. The application software and the program that can be executed on the Java platform are referred to as Java application. It is noted that according to the present invention, the application software execution environment on the MFP is described by way of the Java platform, but is not limited to this. The environment may be any other platform where the application software can be executed.

Furthermore, the application software is referred to herein as application or Appli. Thus, the Java application is referred to as Java Appli, but the Java Appli may simply be referred to as Appli.

First Exemplary Embodiment

A first exemplary embodiment of the present invention will be described.

Figure 2:
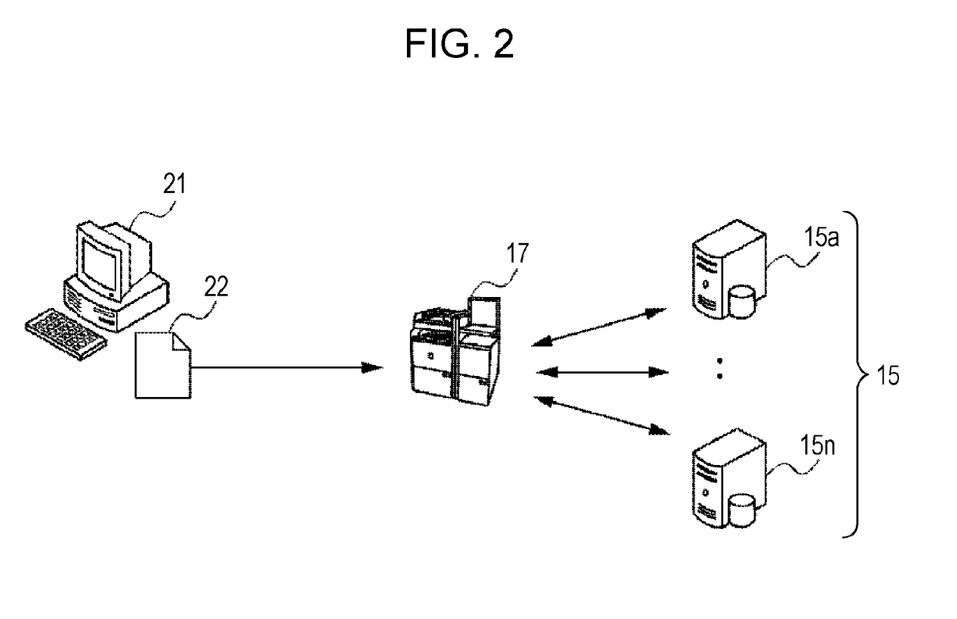
FIG. 2 is an exemplary configuration diagram according to a first exemplary embodiment of the present invention.

FIG. 2 illustrates an exemplary configuration according to the present embodiment.

The management server 15, a client (PC) 21, and the MFP 17 are connected through a network. Then, when the JDF 22 created by or saved in the client 21 is input in the MFP 17, the JDF is analyzed and the MFP 17 determines which license is necessary to obtain the license from the management server 15 and to execute the job.

In FIG. 2, the management servers 15a to 15n manage licenses of the respective Java Applis but licenses of all the Java Applis can also be managed by one management server.

Also, instead of the JDF, a JF may be used for the configuration.

Figure 3:
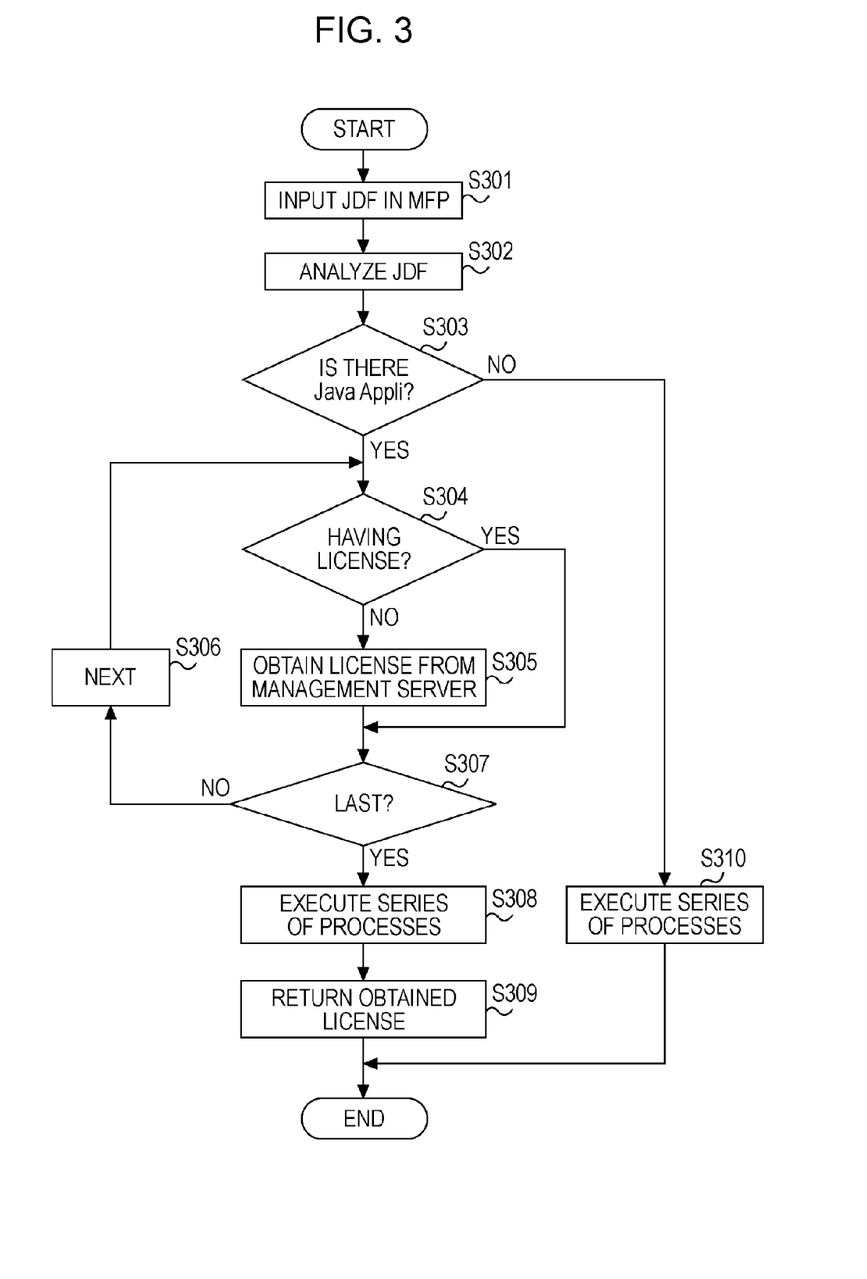
FIG. 3 illustrates a process flow according to the first exemplary embodiment of the present invention.

FIG. 3 illustrates an exemplary flow of a process according to the present embodiment.

When the client 21 inputs a JDF 22 in the MFP 17 (Step S301), the MFP 17 determines which application is necessary for the job execution by analyzing the JDF 22 (Step S302). Next, the MFP 17 determines whether or not there is a Java Appli in the application to be executed (Step S303).

In Step S303, when it is determined that there is no Java Appli, the MFP 17 executes a process described in the JDF 22 (Step S310) to end the process.

In Step S303, when it is determined that there is a Java Appli, the MFP 17 determines whether the MFP itself has the license of each Java Appli or not (Step S304). When the MFP 17 determines that the MFP itself does not have the license, the MFP 17 obtains the floating license from the management server 15 (Step S305). The determination as to whether there is a license (Step S304) and the obtaining of the license (Step S305) are repeatedly executed (Steps S306 and S307) by the same number of times as the number of the Java Applis which are necessary for the job execution determined in Step S302. When the MFP 17 obtains the floating licenses for all the Java Applis, the MFP 17 executes a process described in the JDF 22 (Step S308). After that, the MFP 17 returns the obtained floating licenses to the management server 15 (Step S309) to end the process.

It is noted that an example for a description of the statement of the job of the JDF to be executed by the MFP 17 is "Scan-PDF Conversion-Send" in which functions of the MFP are combined. This description example means an execution of a series of process in which an electronic document obtained by scanning the original is subjected to PDF conversion and the PDF document is attached to a mail to be sent. In this case, Scan and Send are built-in functions of the MFP as the apparatus, and PDF conversion is a function to be executed by the application. In other words, PDF conversion is an application installed on the Java platform of the image processing apparatus (MFP) 17 and is a function (Appli) which requires a license.

It is also noted that the combination of the functions of the MFP in the description of the statement of job in the JDF 22 is composed of built-in functions of the MFP as the apparatus and a Java Appli installed to the MFP, and the combination can be executed by the MFP. The built-in functions of the MFP as the apparatus include scan, copy, print, send functions such as mail send and file transfer, and the like. The application software installed in the MFP may be any Java Appli, and a representative Appli is application software working in cooperation with the built-in functions of the MFP. Examples of the Appli include document data management, a PDF conversion process, an OCR conversion function, a business form function, database, image management, security authorization function, etc.

Second Exemplary Embodiment

A second exemplary embodiment according to the present invention will be described.

According to the first exemplary embodiment, the license obtaining from the management server 15 is always successful, but according to the present embodiment, a description will be provided of an interruption process in a case where the license cannot be obtained.

The present embodiment is characterized in that reorganization and saving as the JDF are performed and the process can be performed by inputting the JDF again. In addition, it is also possible to input the JDF to other MFP.

Also, instead of the JDF, a JF may be used for the configuration.

Figure 4:
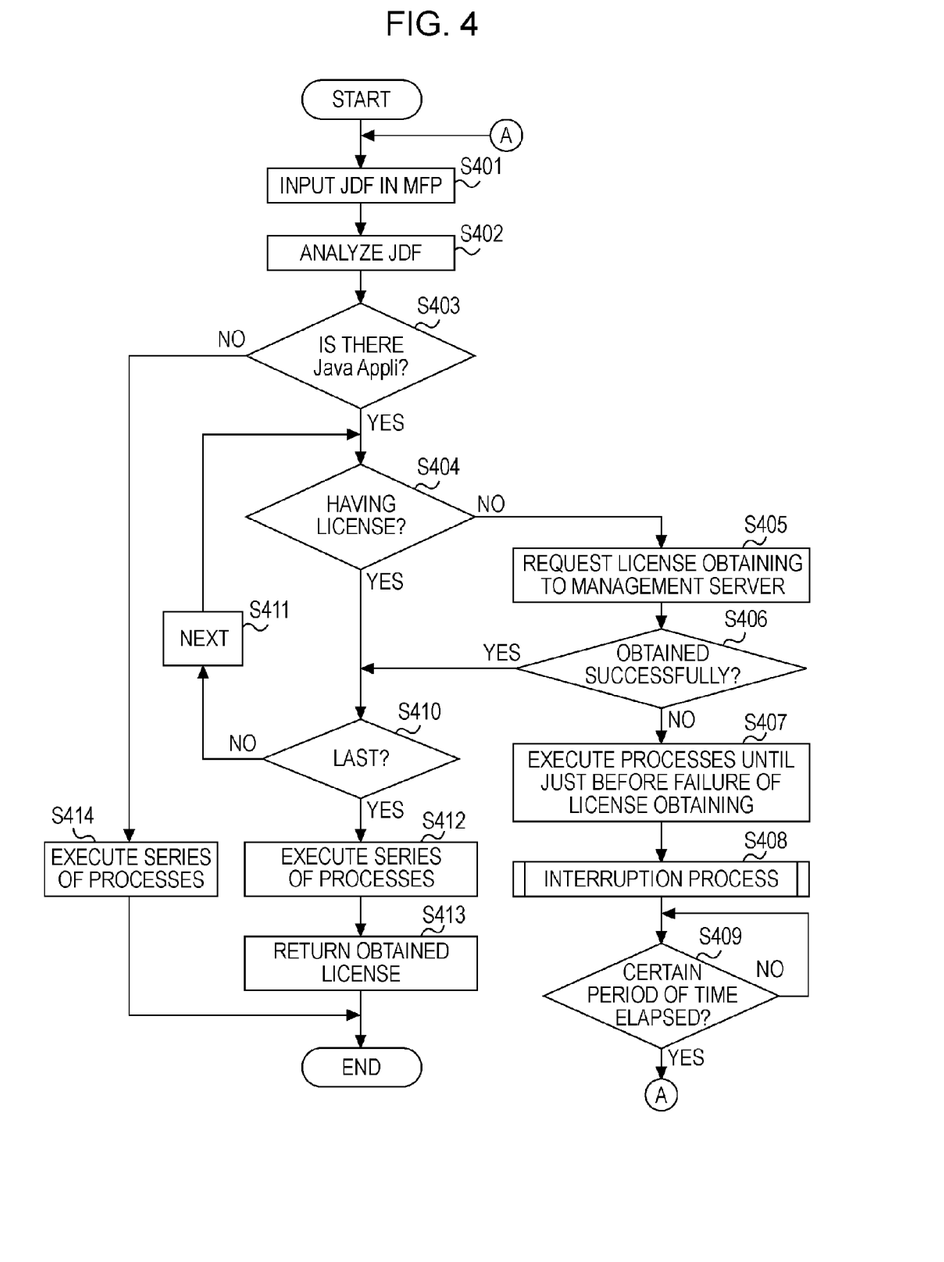
FIG. 4 illustrates a process flow according to a second exemplary embodiment of the present invention.

In a case where the license cannot be obtained because, for example, a communication cannot be performed with the management server or the number of licenses reaches an upper limit upon the license obtaining request with respect to the management server 15 according to the first exemplary embodiment, the JDF is reorganized on the basis of the current job status and a progress of the series of the processes. After a certain period of time elapses, the JDF is input again to obtain the license and to resume the process.

FIG. 4 illustrates an exemplary process flow according to the present embodiment.

When the client 21 inputs the JDF 22 in the MFP 17 (Step S401), the MFP 17 determines which application is necessary for the job execution by analyzing the JDF 22 (Step S402). Next, the MFP 17 determines whether or not there is a Java Appli in the application to be executed (Step S403).

In Step S403, when it is determined that there is no Java Appli, the MFP 17 executes a process described in the JDF 22 (Step S414) to end the process.

In Step S403, when it is determined that there is a Java Appli, the MFP 17 determines whether the MFP itself has the license of each Java Appli or not (Step S404). When the MFP 17 determines that the MFP itself does not have the license, the MFP 17 requests obtaining of the floating license to the management server 15 (Step S405).

The MFP 17 determines whether the floating license of the Java Appli is obtained or not (Step S406). In a case where the obtaining of the floating license failed, the processes until just before the failure of license obtaining are performed (Step S407). After that, the interruption process is performed (Step S408). In this case, the processes of the description in the JDF are not completed until the end and thus are interrupted.

It is noted that the case where the license obtaining failed refers to a case where the lending status of the number of licenses issued by the license management server 15 reaches the upper limit. As the license management server 15 adopts the floating license method, the licenses are issued and returned in response to requests from the image processing apparatus 17 and the client PC. The returning of the license is performed when the image processing apparatus completes the process of the application software. In addition, the case where the license obtaining failed may refer to a case where a connection cannot be temporarily established with respect to the license management server 15 due to a failure of the network or other causes.

Figure 5:
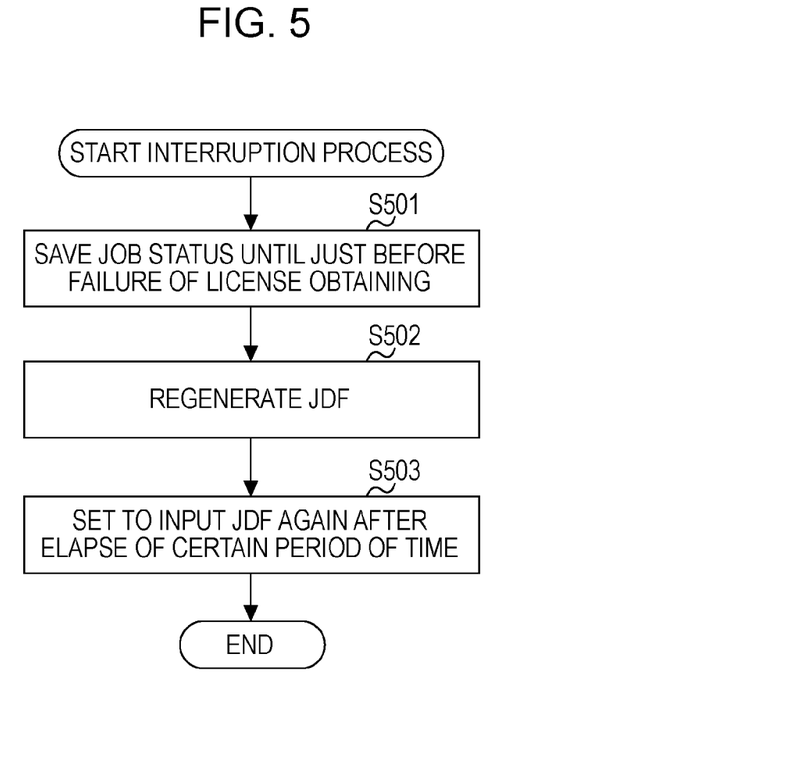
FIG. 5 illustrates an interruption process flow according to the second exemplary embodiment of the present invention.

FIG. 5 illustrates a flow of the interruption process S408 according to the present embodiment.

The interruption process (Step S408) saves the status of the job executed in Step S407 (Step S501) and the MFP 17 reorganizes the JDF 22 on the basis of the progress of the process (until which process in the series of the processes is completed) and the job status (Step S502). The reorganized JDF 22 may be saved in the MFP 17 or saved in other location. Examples of the other location include a shared file server.

The MFP 17 performs such a setting that the JDF 22 is input again after a certain period of time elapses (Step S503). A set value of the certain period of time may be set in advance or set by the user on a case-by-case basis.

The MFP 17 determines whether the certain period of time has elapsed or not after the interruption process (Step S409). When it is determined that the certain period of time has elapsed, the reorganized JDF 22 is input again (A) (Step S401) to resume the process. Then, all the processes described in the JDF 22 are executed to the end.

For example, when there is a process "Scan-PDF Conversion-Send", the interruption process is performed while the license of PDF conversion cannot be obtained. Then, after the resuming (re-inputting), "Send" that is the last process is executed and the series of the processes described in the JDF are executed for completion. For example, when cooperation of a process "Scan-PDF Conversion-Send" is described as the reorganized JDF 22, "Scan" as the process until before "PDF conversion" is performed and the interruption process is performed. Thus, "PDF Conversion-Send" is described in the JDF 22 to be reorganized.

The process in a case where the licenses for all the Java Applis are obtained in Steps S410-S413 is the same as that according to the first exemplary embodiment (Steps S307-S309) and thus a description thereof will not be repeated.

Third Exemplary Embodiment

A third exemplary embodiment according to the present invention will be described.

The second exemplary embodiment has described the case where the job and the statement are integrated to each other and when the license obtaining failed, the JDF is reorganized while reflecting the job status until just before the failure of the license obtaining to input the JDF again.

According to the present embodiment, a description will be provided of such an interruption process in a case where the job and the statement are independently saved. Herein the statement has the same meaning as the JDF.

When the license cannot be obtained, the process until just before that point is executed. After the execution, the job is saved. Also the process progress is saved in the statement. After a certain period of time elapses, the job and the statement thus saved are obtained to determine which process is resumed on the basis of the process progress described in the statement. Obtaining a license for the Java Appli is requested to resume the process.

It is noted that the MFP 17 that resumes the process and the MFP that interrupts the job may be different MFPs. In other words, the reorganized JDF 22 and the temporarily interrupted and saved job are placed so as to be obtained by another MFP, the job resuming can be performed. For example, when the reorganized JDF 22 and the temporarily interrupted and saved job are saved in a shared folder on the file server, other MFP can obtain the reorganized JDF and the job.

Figure 6:
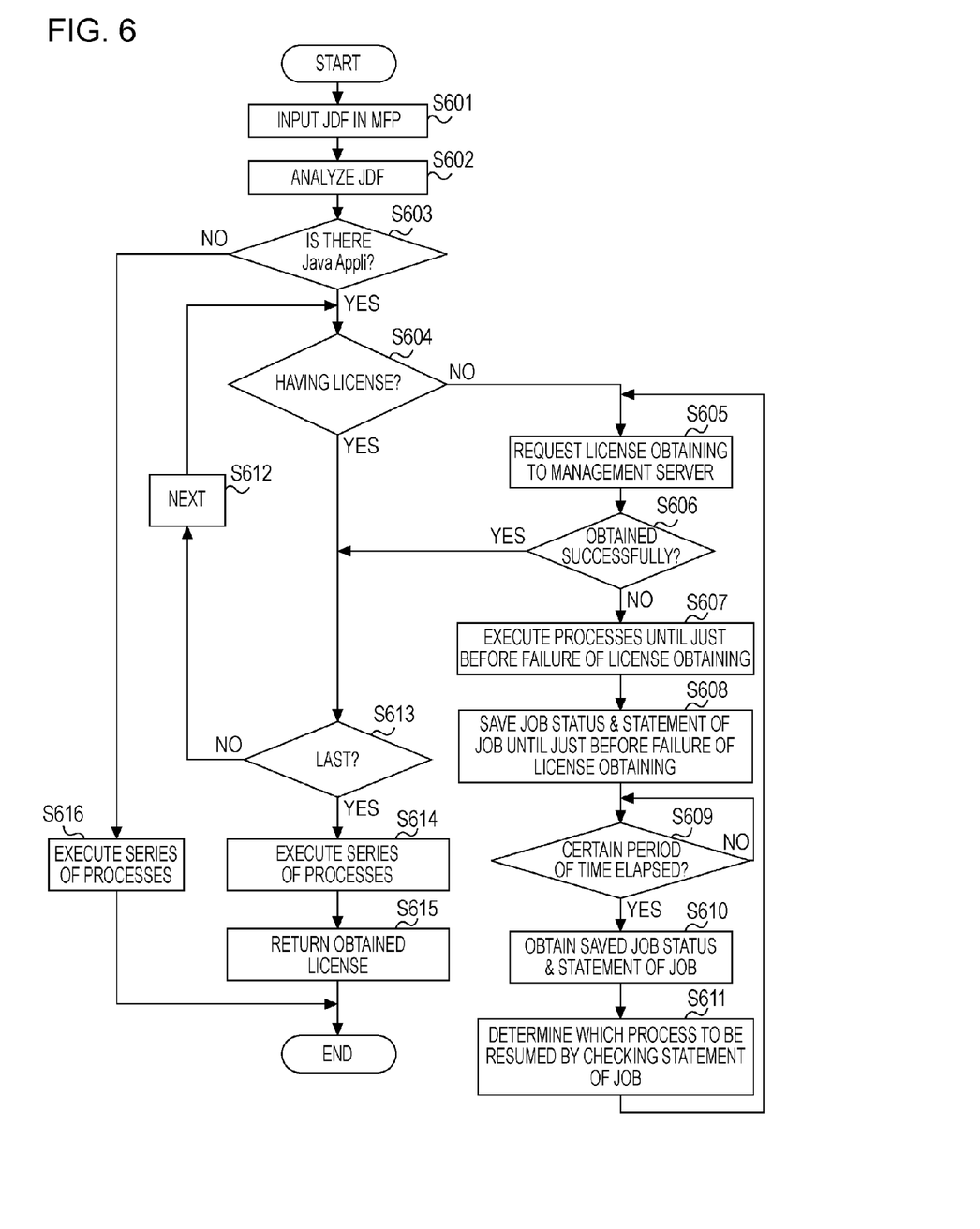
FIG. 6 illustrates a process flow according to a third exemplary embodiment of the present invention.

FIG. 6 illustrates an exemplary process flow according to the present embodiment.

When the client 21 inputs the JDF 22 in the MFP 17 (Step S601), the MFP 17 determines which application is necessary for the job execution by analyzing the JDF 22 (Step S602). Next, the MFP 17 determines whether or not there is a Java Appli in the application to be executed (Step S603).

In Step S603, when it is determined that there is no Java Appli, the MFP 17 executes a process described in the JDF 22 (Step S616) to end the process.

In Step S603, when it is determined that there is a Java Appli, the MFP 17 determines whether the MFP itself has the license of each Java Appli or not (Step S604). When the MFP 17 determines that the MFP itself does not have the license, the MFP 17 requests obtaining of the floating license to the management server 15 (Step S605).

The MFP 17 determines whether the floating license of the Java Appli is obtained or not (Step S606). In a case where the obtaining of the floating license failed, the job processes until just before the failure of license obtaining are performed (Step S607). After that, the MFP 17 saves the job in a storage area. Also, the MFP 17 describes the process progress in the statement and saves the statement in the storage area (Step S608).

After a certain period of time elapses (Step S609), the MFP 17 obtains the job and the statement thus saved in the storage area (Step S610) and determines which process is to be resumed on the basis of the process status described in the statement (Step S611). Then, obtaining request of the floating license for the Java Appli is performed (Step S605) to resume the process.

The process in a case where the licenses for all the Java Applis are obtained in Steps S613-S615 is the same as that according to the first exemplary embodiment (Steps SS307-S309) and thus a description thereof will not be repeated.

Also, instead of the JDF, a JF may be used for the configuration.

Other Embodiments

The present invention can be applied in embodiment modes as, for example, a system, an apparatus, a method, a program, or a storage medium. To be more specific, the present invention may be applied to a system composed of a plurality of devices or applied to an apparatus composed of a single device.

It is noted that the present invention includes a case where a program (software) is directly or remotely supplied to the system or the apparatus and a computer of the system or the apparatus reads out and executes a program supplied, thus achieving the functions of the above-described embodiments. In this case, the supplied program is a program corresponding to the flowcharts illustrated in the drawings according to the above-described embodiments.

Therefore, in order that the process of the function (application software) according to the present invention is realized by the computer, the program code itself installed in the computer also realizes the present invention.

In that case, as long as the function of the program is provided, modes such as an object code, a program executed by an interpreter, and script data supplied to an OS may be adopted.

Examples of a recording medium for supplying the program include: a floppy disk, a hard disk drive, an optical disk, an opto-magnetic (MO) disk, a CD-ROM, a CD-R, a CD-RW, a magnetic tape, a non-volatile memory card, a ROM, a DVD (DVD-ROM, DVD-R), etc.

In addition, a method of supplying the program include a method in which a browser of the client computer is used to connect to a website on the Internet and the computer program of the present invention is downloaded from the website on the recording medium such as the hard disk drive. In this case, the downloaded program may be composed of a compressed file having an automatic installment function. Also, the present invention can also be realized while the program code constituting the program of the present invention is divided into a plurality of files and the respective files are downloaded from different websites. In other words, the present invention also includes a WWW server for allowing a plurality of users to download the program file for realizing the process of the function (application software) according to the present invention by the computer.

Furthermore, such a mode can be adopted that the program of the present invention is encrypted to be stored on a recording medium such as a CD-ROM and the recording medium is distributed to the user. In this case, such a user satisfying a predetermined condition can be allowed to download key information for decrypting the encryption from a website via the Internet, the encrypted program is executed by using the key information, and the program is installed in the computer.

In addition, the program read by the computer is executed to realize the above-described embodiments, and also on a basis of an instruction of the program, the functions of the above-described embodiments can be realized in cooperation with the OS running on the computer or the like. In this case, the OS or the like performs a part or all of the actual processes and the above-described embodiments are realized by the process.

Moreover, the program code read out from the recording medium may be written on a memory that is provided to a function expansion board inserted in the computer or a function expansion unit connected to the computer and a part or all of the functions of the above-described embodiments may be realized by the process. In this case, after the program is written in the function expansion board or the function expansion unit, in accordance with an instruction of the program code, a CPU or the like provided to the function expansion board or the function expansion unit performs a part or all of the actual processes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-344722 filed Dec. 21, 2006, which is hereby incorporated by reference herein in its entirety.

What is claimed is:

1. An image processing apparatus having an application mounted thereto, requesting license issuance to a license management server apparatus when the application is used, and using the application by obtaining the license, comprising:
   a processor; and
   a memory coupled to the processor and having instructions that, when executed by the processor, cause the processor to perform operations comprising:
      determining if the application is necessary for executing a process of a job by analyzing a statement of job, wherein the statement of the job comprises a series of a plurality of processes to be executed for performing the job;
      determining whether the license is necessary for using the application after the application is determined to be necessary for executing the process of the job;
      making a request of license issuance to the license management server apparatus when the license is determined necessary;
      executing the job in accordance with the statement of the job when the license is obtained based on the request of the license issuance;
      executing the job by executing the series of the plurality of processes of the statement of the job just before the process requiring the license for executing the application and temporarily interrupting the executed job and saving a job status describing the processes executed if the license is not obtained based on the request of the license issuance;
      reorganizing the statement of the job described in the statement based on the processes executed and processes not yet executed based on the temporarily interrupted job; and
      obtaining the reorganized statement of the job after a predetermined time elapses since the license is not obtained,
      wherein executing the job comprises executing the job in accordance with the reorganized statement of the job.

2. The image processing apparatus according to claim 1, further comprising:
   a license obtaining determination unit configured to determine, when the application determination unit and the license determination unit determines that licenses are necessary for using applications or executing the job, whether all the licenses for the applications are obtained based on the request of the license issuance by the license obtaining unit; and
   wherein the job save unit temporarily interrupts the job executed by the job execution unit and saves a job status when the licenses are not obtained.

3. The image processing apparatus according to claim 1, wherein the license management apparatus refuses to issue the license based on the request of the license issuance when the number of licenses that can be issued exceeds an upper limit.

4. A method for an image processing apparatus having an application mounted thereto, requesting license issuance to a license management server apparatus when the application is used, and using the application by obtaining the license, the method comprising:
   determining if the application is necessary for executing a process of a job by analyzing a statement of job, wherein the statement of the job comprises a series of a plurality of processes to be executed for performing the job;
   determining whether the license is necessary for using the application after the application is determined to be necessary for executing the process of the job;
   making a request of license issuance to the license management server apparatus when the license is determined necessary;
   executing the job in accordance with the statement of the job when the license is obtained based on the request of the license issuance;
   executing the job by executing the series of the plurality of processes of the statement of the job just before the process requiring the license for executing the application and temporarily interrupting the job and saving a job status describing the processes executed if the license is not obtained based on the request of the license issuance;
   reorganizing the statement of the job described in the statement based on the processes executed and processes not yet executed based on the temporarily interrupted job; and
   obtaining the reorganized statement of the job after a predetermined time elapses since the license is not obtained,
   wherein executing the job comprises executing the job in accordance with the reorganized statement of the job.

5. The method according to claim 4, further comprising:
   determining, when licenses are necessary for using applications or executing the job, whether all the licenses for the applications are obtained based on the request of the license issuance; and
   temporarily interrupting the job and saving a job status when the licenses are not obtained.

6. The method according to claim 4, further comprising refusing to issue the license when a number of licenses exceeds an upper limit.

7. A computer-readable non-transitory storage medium storing instructions that, when executed by a processor, cause the processor to perform operations comprising:

determining if an application is necessary for executing a process of a job by analyzing a statement of job, wherein the statement of the job comprises a series of a plurality of processes to be executed for performing the job;

determining whether the license is necessary for using the application after the application is determined to be necessary for executing the process of the job;

making a request of license issuance to a license management server apparatus when the license is determined necessary;

executing the job in accordance with the statement of the job when the license is obtained based on the request of the license issuance;

executing the job by executing the series of the plurality of processes of the statement of the job just before the process requiring the license for executing the application and temporarily interrupting the job and saving a job status describing the processes executed if the license is not obtained based on the request of the license issuance;

reorganizing the statement of the job described in the statement based on the processes executed and processes not yet executed based on the temporarily interrupted job; and     obtaining the reorganized statement of the job after a predetermined time elapses since the license is not obtained,     wherein executing the job comprises executing the job in accordance with the reorganized statement of the job.

* * * * *